US008393313B2

United States Patent
Sato et al.

(10) Patent No.: US 8,393,313 B2
(45) Date of Patent: Mar. 12, 2013

(54) CONTROL APPARATUS AND CONTROL METHOD FOR INTERNAL COMBUSTION ENGINE

(75) Inventors: Akira Sato, Gotenba (JP); Yasuyuki Irisawa, Susono (JP); Shinichi Mitani, Susono (JP); Takashi Tsunooka, Gotenba (JP); Shigeyuki Urano, Susono (JP); Satoshi Yoshizaki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 117 days.

(21) Appl. No.: 13/162,221

(22) Filed: Jun. 16, 2011

(65) Prior Publication Data

US 2011/0308500 A1    Dec. 22, 2011

(30) Foreign Application Priority Data

Jun. 18, 2010   (JP) ................................ 2010-139344

(51) Int. Cl.
 *F02G 5/00*    (2006.01)
 *F02G 5/02*    (2006.01)
(52) U.S. Cl. .................... 123/557; 123/558; 123/179.15
(58) Field of Classification Search .................. 123/543, 123/557, 558, 179.15, 575, 576, 578, 304, 123/298, 519; 701/113; 239/135; 137/334, 137/336

See application file for complete search history.

(56) References Cited

U.S. PATENT DOCUMENTS

| 4,509,464 A * | 4/1985 | Hansen ......................... 123/1 A |
| 8,006,671 B2 * | 8/2011 | Maeda et al. .................. 123/491 |
| 2008/0053416 A1 * | 3/2008 | Hines ............................ 123/557 |
| 2011/0247593 A1 * | 10/2011 | Yoshizaki et al. ............. 123/520 |

FOREIGN PATENT DOCUMENTS

| JP | 61098955 A | 5/1986 |
| JP | 01203629 | 8/1989 |
| JP | 07189826 A | 7/1995 |
| JP | 10-331727 A | 12/1998 |
| JP | 2000-345934 A | 12/2000 |
| JP | 2003027989 A | 1/2003 |
| JP | 2005-127282 A | 5/2005 |
| JP | 2007224878 A | 9/2007 |
| JP | 2009198450 A | 9/2009 |
| WO | WO-2011114525 A1 | 9/2011 |

* cited by examiner

*Primary Examiner* — Mahmoud Gimie
(74) *Attorney, Agent, or Firm* — Gifford, Krass, Sprinkle, Anderson & Citkowski, P.C.

(57) ABSTRACT

A control apparatus and control method is provided for an internal combustion engine that includes a vaporized fuel tank in which vaporized fuel is stored, and a normally-closed vaporized fuel supply valve that opens and closes a connecting portion between the vaporized fuel tank and a surge tank. This apparatus and method produce vaporized fuel by injecting fuel into the tank while the vaporized fuel supply valve is closed while the engine is operating, then open the vaporized fuel supply valve at engine startup and supply the vaporized fuel stored in the tank to the surge tank. If there is no vaporized fuel remaining in the vaporized fuel tank when the engine stops, vacuum is generated in the vaporized fuel tank by temporarily opening the vaporized fuel supply valve before the engine stops. Vaporized fuel is then produced by injecting fuel into the vaporized fuel tank in this vacuum state.

10 Claims, 7 Drawing Sheets

CONTROL APPARATUS AND CONTROL METHOD FOR INTERNAL COMBUSTION ENGINE

CROSS-REFERENCE TO RELATED APPLICATIONS

This application claims priority to Japanese Patent Application No. 2010-139344 filed on Jun. 18, 2010, which is incorporated herein by reference in its entirety including the specification, drawings and abstract.

BACKGROUND OF THE INVENTION

1. Field of the Invention

The invention relates to a control apparatus and control method for an internal combustion engine that uses low volatile fuel such as alcohol fuel, for example.

2. Description of the Related Art

Japanese Patent Application Publication No. 2007-224878 (JP-A-2007-224878) describes a control apparatus for an internal combustion engine that uses alcohol fuel. Alcohol fuel does not easily vaporize particularly at low temperatures, so a vaporizing chamber to vaporize the fuel at startup is provided in the internal combustion engine of the related art. This vaporizing chamber has a closed structure in which it is cut off from the outside, and is connected to an intake passage via a throttled passage. Also, a startup fuel injection valve that injects fuel into the vaporizing chamber, and a heater for heating the injected fuel are both provided in the vaporizing chamber.

At startup of the internal combustion engine, the heater is first activated when a start signal is output to the internal combustion engine. Then when an appropriate amount of time has passed, fuel is injected into the vaporizing chamber from the startup fuel injection valve. When fuel is injected, the pressure in the vaporizing chamber becomes reduced due to the effect of intake vacuum produced by cranking. As a result, the injected fuel vaporizes from the heat of the heater in the reduced-pressure vaporizing chamber, and is supplied to the cylinders via the intake passage. In this way, the related art ensures startability during a cold-start, for example, by vaporizing the fuel in the vaporizing chamber at startup.

Incidentally, with the related art described above, vaporized fuel is produced by injecting fuel into the vaporizing chamber after activating the heater at startup. However, in this case, after the start signal is output to the internal combustion engine, the temperature of the heater rises, the injected fuel is heated, and the pressure in the vaporizing chamber is reduced, and as a result, vaporized fuel is produced. Therefore, with the related art, it takes time to produce vaporized fuel at startup, so the amount of vaporized fuel that is supplied may be insufficient, and as a result, startability and emissions characteristics may be poor.

SUMMARY OF THE INVENTION

In view of such problems, the invention thus provides a control apparatus and control method for an internal combustion engine, that is capable of quickly supplying vaporized fuel into the cylinders, and thus improving startability and emissions characteristics, even under conditions in which fuel does not easily vaporize, such as during a cold start.

One aspect of the invention relates to a control apparatus for an internal combustion engine. This control apparatus includes a fuel tank in which fuel is stored; a vaporized fuel tank that is connected to a midway portion of an intake passage of the internal combustion engine and in which vaporized fuel that is the fuel that has been vaporized is stored; an in-tank fuel supplying device that supplies fuel in the fuel tank to the vaporized fuel tank; a normally-closed vaporized fuel supply valve that opens and closes a connecting portion between the vaporized fuel tank and the intake passage; a vaporized fuel producing apparatus that produces vaporized fuel in the vaporized fuel tank by driving the in-tank fuel supplying device while the vaporized fuel supply valve is closed, while the internal combustion engine is operating; a vaporized fuel supplying device that supplies vaporized fuel stored in the vaporized fuel tank to the intake passage by opening the vaporized fuel supply valve at startup of the internal combustion engine; a determining apparatus that determines whether an amount of vaporized fuel in the vaporized fuel tank will be insufficient when the internal combustion engine is started next, when an engine stop command has been output while the internal combustion engine is operating; a vacuum generating apparatus that generates a vacuum in the vaporized fuel tank by temporarily opening the vaporized fuel supply valve before the internal combustion engine stops, when it is determined by the determining apparatus that the amount of vaporized fuel will be insufficient; and a production controlling apparatus that activates the vaporized fuel producing apparatus after the vacuum generating apparatus has been activated.

Another aspect of the invention relates to a control method for an internal combustion engine. The internal combustion engine includes a fuel tank in which fuel is stored; a vaporized fuel tank that is connected to a midway portion of an intake passage of the internal combustion engine and in which vaporized fuel that is the fuel that has been vaporized is stored; an in-tank fuel supplying device that supplies fuel in the fuel tank to the vaporized fuel tank; a normally-closed vaporized fuel supply valve that opens and closes a connecting portion between the vaporized fuel tank and the intake passage; a vaporized fuel producing apparatus that produces vaporized fuel in the vaporized fuel tank by driving the in-tank fuel supplying device while the vaporized fuel supply valve is closed, while the internal combustion engine is operating; and a vaporized fuel supplying device that supplies vaporized fuel stored in the vaporized fuel tank to the intake passage by opening the vaporized fuel supply valve at startup of the internal combustion engine. The control method includes determining whether an amount of vaporized fuel in the vaporized fuel tank will be insufficient when the internal combustion engine is started next, when an engine stop command has been output while the internal combustion engine is operating; generating a vacuum in the vaporized fuel tank by temporarily opening the vaporized fuel supply valve before the internal combustion engine stops, when it is determined that the amount of vaporized fuel will be insufficient; and producing vaporized fuel in the vaporized fuel tank using the vaporized fuel producing apparatus after a vacuum has been generated in the vaporized fuel tank.

According to the control apparatus and control method for an internal combustion engine described above, when an engine stop command has been output while the internal combustion engine is operating, it is determined whether the amount of vaporized fuel in the vaporized fuel tank will be insufficient when the engine is started next. If it is determined that the amount of vaporized fuel will be insufficient, a vacuum is generated in the vaporized fuel tank by temporarily opening the vaporized fuel supply valve before the engine stops. Therefore, it is possible to create an environment in the vaporized fuel tank that facilitates the production of vaporized fuel, so vaporized fuel is able to be effectively produced even when the temperature inside the vaporized fuel tank is low.

Also, the control apparatus described above may also include a vaporized fuel remaining amount calculating apparatus that calculates a remaining amount of vaporized fuel in the vaporized fuel tank after startup of the internal combustion engine. Further, the determining apparatus may determine that the amount of vaporized fuel in the vaporized fuel tank will be insufficient at startup next when the remaining amount of vaporized fuel is substantially zero and the vaporized fuel producing apparatus has not been activated after startup.

According to the control apparatus described above, when the remaining amount of vaporized fuel in the vaporized fuel tank is substantially zero and the vaporized fuel producing apparatus has not been activated after startup, it can be determined that no new vaporized fuel has been produced in the vaporized fuel tank since the amount of vaporized fuel had become substantially zero. Therefore, it can be determined that the vaporized fuel will be insufficient when the engine is started next.

Also, in the control apparatus described above, the vacuum generating apparatus may include a pressure detecting device that detects a pressure in the vaporized fuel after the vaporized fuel supply valve has been opened, and close the vaporized fuel supply valve when the pressure in the vaporized fuel reaches a predetermined vacuum.

According to the control apparatus described above, when generating a vacuum in the vaporized fuel tank before the engine stops, the vaporized fuel supply valve is closed when the pressure in the vaporized fuel tank after the vaporized fuel supply valve is opened reaches the predetermined vacuum. Therefore, the predetermined vacuum can be generated in the vaporized fuel tank.

Also, in the control apparatus described above, the vacuum generating apparatus may include an engine speed increasing apparatus that increases the speed of the internal combustion engine before the vaporized fuel supply valve is opened.

According to the control apparatus described above, the speed of the internal combustion engine is increased before the vaporized fuel supply valve of the vacuum generating apparatus is opened. Therefore, an even greater vacuum can be generated when the vaporized fuel supply valve is opened thereafter.

Also, in the control apparatus described above, the engine speed increasing apparatus may include a target engine speed calculating apparatus that calculates a target engine speed of the internal combustion engine for making the vaporized fuel produced when the vaporized fuel producing apparatus is activated become a predetermined amount, and the engine speed increasing apparatus may increase the engine speed to the target engine speed when the engine speed is lower than the target engine speed.

According to the control apparatus described above, a target engine speed for making the amount of vaporized fuel produced when the vaporized fuel producing apparatus is activated become a predetermined amount is calculated, and the engine speed is increased to the target engine speed when the current engine speed is lower than the target engine speed.

Also, the control apparatus may also include a fuel cut apparatus that executes a fuel cut when a predetermined execution condition is satisfied during deceleration of the internal combustion engine; a vaporized fuel remaining amount calculating apparatus that calculates a remaining amount of vaporized fuel in the vaporized fuel tank after startup of the internal combustion engine; an execution condition changing apparatus that, when the predetermined execution condition is at least a condition that a coolant temperature of the internal combustion engine be equal to or greater than a predetermined coolant temperature, reduces a value of the predetermined coolant temperature of the execution condition when the remaining amount of vaporized fuel is substantially zero and the vaporized fuel producing apparatus has not been activated after startup; a second vacuum generating apparatus that generates a vacuum in the vaporized fuel tank by temporarily opening the vaporized fuel supply valve while the fuel cut is being executed; and a second production controlling apparatus that activates the vaporized fuel producing apparatus after the second vacuum generating apparatus has been activated.

According to the control apparatus described above, the fuel cut executing condition relating to the coolant temperature is reduced when the remaining amount of vaporized fuel in the vaporized fuel tank is substantially zero and the vaporized fuel producing apparatus has not been activated after startup. The intake pipe vacuum increases while the fuel cut is being executed. Therefore, vacuum can be generated in the vaporized fuel tank using the fuel cut during cold operation, so vaporized fuel can be efficiently produced even during cold operation.

Also, this control apparatus may also include an apparatus that executes lockup while the fuel cut is being executed, and an apparatus that advances a timing of the lockup during a period of time during which the value of the predetermined coolant temperature is reduced by the execution condition changing apparatus.

According to the control apparatus described above, the execution timing of lockup that is executed during a fuel cut can be advanced when the execution condition of the fuel cut is reduced. Therefore, the intake pipe vacuum that is generated during a fuel cut can be effectively increased.

Also, the control apparatus described above may also include a vaporized fuel remaining amount calculating apparatus that calculates a remaining amount of vaporized fuel in the vaporized fuel tank after startup of the internal combustion engine; a target vacuum calculating apparatus that calculates a target vacuum in the vaporized fuel tank that is necessary to store a larger amount of vaporized fuel than the remaining amount of vaporized fuel, when the remaining amount of vaporized fuel is less than a predetermined value; a third vacuum generating apparatus that generates a vacuum in the vaporized fuel tank by temporarily opening the vaporized fuel supply valve when a vacuum in the intake passage is larger than the target vacuum; and a third production controlling apparatus that activates the vaporized fuel producing apparatus after the third vacuum generating apparatus has been activated.

According to the control apparatus described above, a target vacuum for the vaporized fuel tank necessary to store more vaporized fuel than the currently remaining amount of vaporized fuel is calculated when the remaining amount of vaporized fuel in the vaporized fuel tank is less than the predetermined amount. If the vacuum of the intake passage is greater (i.e., a larger vacuum) than the target vacuum, the pressure in the vaporized fuel tank is decreased by temporarily opening the vaporized fuel supply valve. Therefore, vacuum can effectively be generated in the vaporized fuel tank while the internal combustion engine is operating, so vaporized fuel can effectively be produced even when the temperature in the vaporized fuel tank is low.

Further, in this control apparatus, the third vacuum generating apparatus may close the vaporized fuel supply valve when a vacuum in the vaporized fuel tank reaches the target vacuum.

According to this control apparatus, the pressure in the vaporized fuel tank can be decreased to the target vacuum, so more vaporized fuel than the current remaining amount of vaporized fuel can be stored by driving the in-tank fuel supplying device thereafter.

Still further, in the control apparatus described above, the fuel may be fuel that includes alcohol.

According to the control apparatus described above, even when an alcohol fuel that does not easily vaporize at low temperatures is used, startability can be improved by storing vaporized fuel in the vaporized fuel tank while the internal combustion engine is operating, and supplying this vaporized fuel at startup.

According to the invention, vaporized fuel can be produced while the internal combustion engine is operating, and this vaporized fuel can be stored in the vaporized fuel tank using the decrease in pressure that naturally occurs after the engine stops. As a result, it is not necessary to produce vaporized fuel at startup, so vaporized fuel can be quickly supplied into the cylinders even during a cold start.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
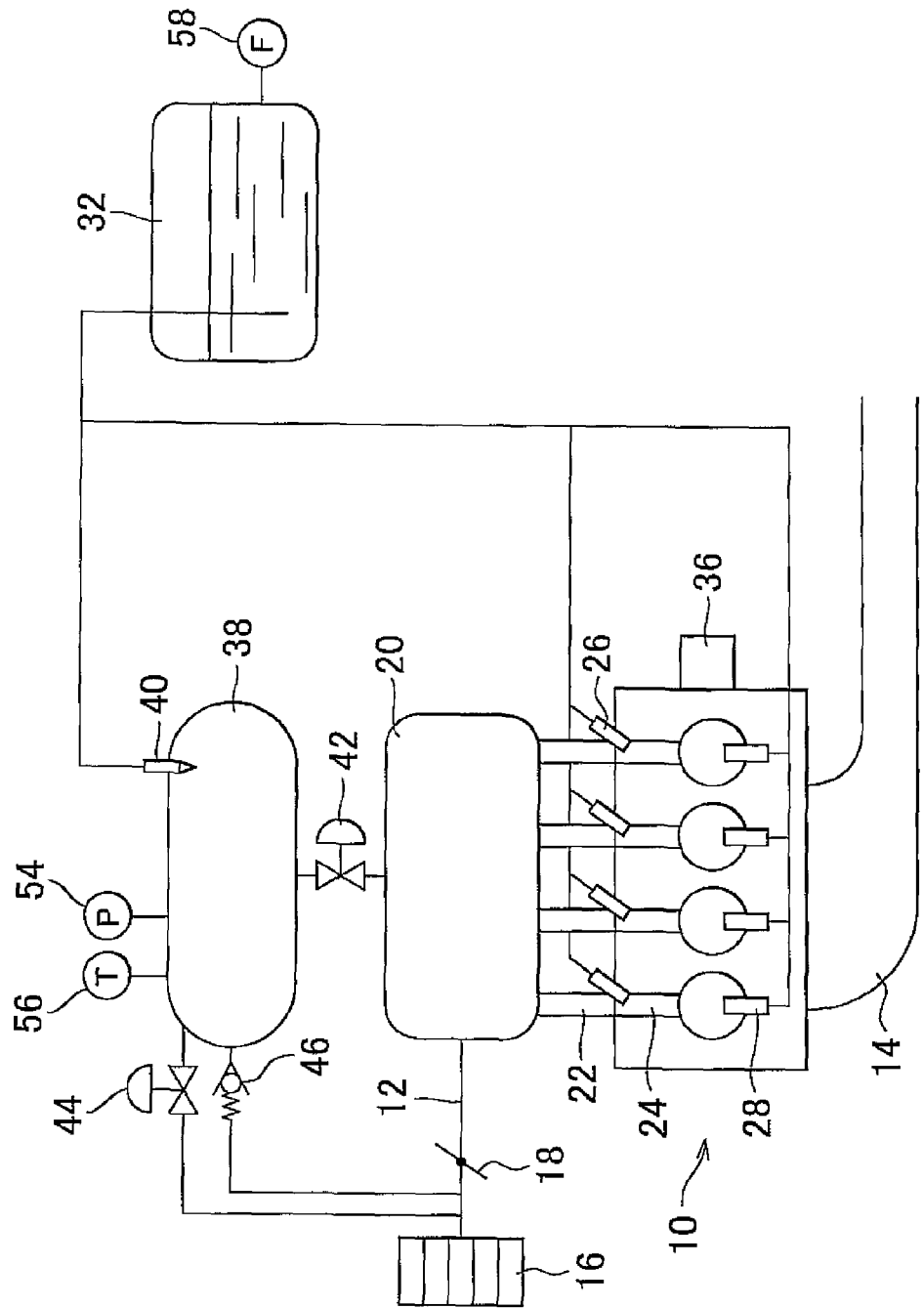
FIG. 1 is an overall block diagram of a system configuration according to a first example embodiment of the invention.

Example embodiments of the present invention will be described in greater detail below with reference to the accompanying drawings. Incidentally, common elements in the drawings will be denoted by like reference characters and redundant descriptions of those elements will be omitted. Also, the invention is not limited to the example embodiments described below.

Hereinafter, a first example embodiment of the invention will be described with reference to FIGS. 1 to 5. FIG. 1 is an overall block diagram of a system configuration according to the first example embodiment of the invention. The system in this example embodiment includes an engine 10 as an internal combustion engine mounted in a FFV (Flexible Fuel Vehicle). Incidentally, a four cylinder engine is shown in FIG. 1, but the invention is not limited to a four cylinder internal combustion engine. The engine 10 includes an intake passage 12 through which air is drawn into combustion chambers of cylinders, and an exhaust passage 14 through which exhaust gas is discharged from the combustion chambers.

An air cleaner 16, a throttle valve 18, and a surge tank 20 are provided in order from the upstream side in the intake passage 12. The throttle valve 18 is formed by an electronically controlled butterfly valve. The throttle valve 18 is driven opened and closed by an ECU 70 that will be described later. This throttle valve 18 is opened and closed between a fully-closed position and a wide-open position, and regulates the amount of intake air that flows through the intake passage 12 according to the opening amount. The surge tank 20 forms a space of a certain area midway in the intake passage 12, and serves to attenuate intake pulsation, for example. The downstream side of the surge tank 20 is connected to an intake port 24 of each cylinder via an intake manifold 22 formed of a plurality of intake pipes. Incidentally, the surge tank 20, the intake manifold 22, and the intake port 24 form part of the intake passage 12.

Further, an intake port injection valve 26 that injects fuel into the intake port 24 and an in-cylinder injection valve 28 that injects fuel directly into the combustion chamber (i.e., into the cylinder) are provided for each cylinder of the engine 10. These injection valves 26 and 28 are formed by typical electromagnetically driven fuel injection valves. Furthermore, a spark plug 30 (see FIG. 2) that ignites an air-fuel mixture that flows into the cylinder, an intake valve (not shown) that opens and closes the intake port 24, and an exhaust valve (also not shown) that opens and closes an exhaust port are all provided for each cylinder. Also, alcohol fuel stored in a liquid state in a fuel tank 32 of the vehicle is supplied to the injection valves 26 and 28 described above.

Also, the engine 10 includes a starter motor 36 that rotatably drives a crankshaft at startup. When a driver of the vehicle turns a starter switch on, an engine start command is output to the ECU 70. As a result, the ECU 70 operates the starter motor 36 to rotate the crankshaft (i.e., perform cranking). Then when the engine has started, i.e., when the engine starts to operate under its own power, cranking is stopped.

Next, a fuel vaporizing system provided in the engine 10 will be described. In this example embodiment, vaporized fuel produced while the engine is operating is stored in a tank, and this vaporized fuel is used at startup the next time the engine 10 is started. The fuel vaporizing system includes a vaporized fuel tank 38, an in-tank injection valve 40, a vaporized fuel supply valve 42, an air introduction valve 44, and a relief valve 46, and the like that will be described below.

The vaporized fuel tank 38 is formed as a pressure tight case having a closed structure, and is made to store vaporized fuel that is the alcohol fuel in the fuel tank 32 after it has been vaporized. Also, the vaporized fuel tank 38 is arranged in a location within the engine compartment to where heat from the engine 10 can easily be conducted, for example. The in-tank injection valve 40 injects (i.e., supplies) fuel stored in the fuel tank 32 into the vaporized fuel tank 38, and is one example of the in-tank fuel supply portion of the invention. The in-tank injection valve 40 is formed by a typical fuel injection valve similar to the injection valves 26 and 28, for example. The fuel injection quantity from the in-tank injection valve 40 is controlled according to a control signal. The fuel injected from the in-tank injection valve 40 vaporizes from the heat in the vaporized fuel tank 38 and thus becomes vaporized fuel.

The vaporized fuel tank 38 is connected to the surge tank 20 on the downstream side of the throttle valve 18. The vaporized fuel supply valve 42 that is formed by a normally-closed electromagnetic valve or the like is provided at this connecting portion. When the vaporized fuel supply valve 42 is closed, communication between the vaporized fuel tank 38 and the surge tank 20 is cut off, such that vaporized fuel is able to be stored in the vaporized fuel tank 38. Also, when the vaporized fuel supply valve 42 is open, the vaporized fuel tank 38 is communicated with the surge tank 20, such that vaporized fuel stored in the vaporized fuel tank 38 is supplied to the surge tank 20.

Also, the air introduction valve 44 is provided in the vaporized fuel tank 38 in a location that allows communication between the inside of the tank and a space outside of the tank. The air introduction valve 44 is formed by a normally-closed electromagnetic valve or the like, which when opened, opens the vaporized fuel tank 38 to ambient air. When vaporized fuel is supplied, both the vaporized fuel supply valve 42 and the air introduction valve 44 are opened at slightly different timings, such that ambient air of an amount corresponding to the amount of vaporized fuel that is supplied is introduced into the vaporized fuel tank 38 through the air introduction valve 44 valve. Incidentally, these valves 42 and 44 are kept closed except for when vaporized fuel is supplied. Also, the air introduction valve 44 is connected to the intake passage 12 between the air cleaner 16 and the throttle valve 18. Therefore, when the air introduction valve 44 is open, air that has been cleaned by the air cleaner 16 and that is unaffected by intake vacuum is introduced into the vaporized fuel tank 38.

Moreover, the normally-closed relief valve 46 that is formed by a check valve or a reed valve or the like, for example, is provided in the vaporized fuel tank 38. When the pressure inside the vaporized fuel tank 38 exceeds a predetermined operating pressure, the relief valve 46 releases this pressure outside (e.g., into the intake passage 12). The operating pressure of this relief valve 46 is set to a pressure that is approximately the same as atmospheric pressure or to a high pressure that is approximately several tens of kPa higher than atmospheric pressure, for example. This setting presumes, for example, that the vaporized fuel tank 38 is maintained at approximately room (i.e., normal) temperature or a temperature slightly higher than room temperature, and that the saturated vapor pressure of the fuel is a pressure that corresponds to this temperature range. As a result, when the fuel injected into the vaporized fuel tank 38 vaporizes, the relief valve 46 allows the air inside the tank to escape to the outside. Also, the relief valve 46 also functions as a safety valve that prevents the pressure inside that tank from becoming excessive while the vaporized fuel tank 38 is closed.

Figure 2:
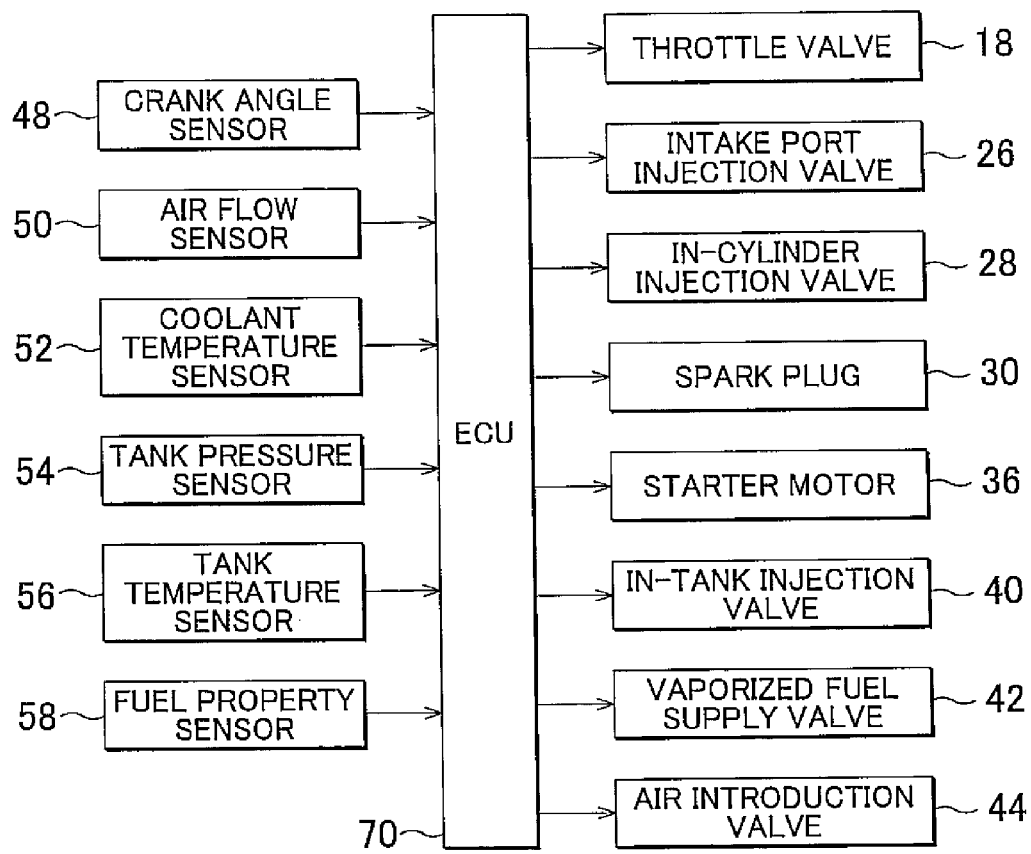
FIG. 2 is a block diagram of a control system of the system in the first example embodiment of the invention.

Next, the control system of the engine 10 will be described with reference to FIG. 2. FIG. 2 is a block diagram of the control system of the system in the first example embodiment of the invention. As shown in the drawing, the system of this example embodiment includes a sensor system that includes a plurality of sensors, and an ECU (Electronic Control Unit) 70 that controls the operating state of the engine 10.

First, the sensor system will be described. A crank angle sensor 48 outputs a signal in synchronization with the rotation of the crankshaft of the engine 10. The ECU 70 detects the crank angle and the engine speed based on this output. Also, an air flow sensor 50 detects the intake air amount, and a coolant temperature sensor 52 detects the coolant temperature of the engine. Also, a tank pressure sensor 54 detects the pressure inside the vaporized fuel tank 38, a tank temperature sensor 56 detects the temperature inside the vaporized fuel tank 38, and a fuel property sensor 58 detects the alcohol concentration in the fuel as the property of the fuel.

In addition to the sensors described above, the sensor system also includes a variety of other sensors necessary to control the vehicle and the engine (such as an air-fuel ratio sensor that detects the exhaust gas air-fuel ratio, a throttle sensor that detects the opening amount of the throttle valve 18, and an accelerator operation amount sensor that detects the accelerator operation amount, and the like). These sensors are all connected to the input side of the ECU 70. Incidentally, the invention does not necessarily require the tank temperature sensor 56. That is, the tank internal temperature may instead be estimated based on the temperature and operating history of the engine, and the conduction characteristic of heat to the vaporized fuel tank 38, and the like.

Meanwhile, various actuators, including the throttle valve 18, the injection valves 26, 28, and 40, the spark plug 30, the starter motor 36, the vaporized fuel supply valve 42, and the air introduction valve 44, and the like are connected to the output side of the ECU 70. The ECU 70 detects information about the operation of the engine from this sensor system, and performs operation control by driving the actuators based on the detection results. More specifically, the ECU 70 detects the crank angle and the engine speed based on the output from the crank angle sensor 48, and detects the intake air amount with the air flow sensor 50. Also, the ECU 70 determines the ignition timing and drives the spark plug 30 based on the crank angle, while performing normal fuel injection control that will be described below.

Normal fuel injection control is executed while the engine 10 is operating, except for when vaporized fuel supply control that will be described below is executed, and also includes startup fuel injection control. In this fuel injection control, the ECU 70 first calculates a fuel injection quantity based on the intake air amount, the engine speed, and the temperature of the engine coolant and the like, and determines the fuel injection timing based on the crank angle, and then drives one or both of the injection valves 26 and 28. In this case, the ratio of the injection quantity from the intake port injection valve 26 and the in-cylinder injection valve 28 is variably set according to the property of the fuel and the operating state of the engine. Further, the ECU 70 executes vaporized fuel production control and vaporized fuel supply control, both of which are described below, as controls of the fuel vaporizing system.

Vaporized fuel production control is control that produces vaporized fuel by vaporizing fuel in the vaporized fuel tank 38 while the engine 10 is operating (preferably while the engine 10 is operating after having warmed up completely). More specifically, in vaporized fuel production control, fuel is injected from the in-tank injection valve 40 while the vaporized fuel supply valve 42 and the air introduction valve 44 are both closed. At this time, the fuel injection quantity is calculated such that all of the injected fuel is vaporized and the vapor pressure of the vaporized fuel becomes the saturated vapor pressure.

Then, the fuel injected from the in-tank injection valve 40 is immediately vaporized, thus becoming vaporized fuel, while air inside the tank is forced out through the relief valve 46. At this time, the relief valve 46 prevents vaporization of the fuel from being impeded by the air pressure in the tank, thereby promoting the production of vaporized fuel. As a result, once fuel vaporization is complete, almost all of the air inside the tank has been discharged, so the vaporized fuel tank 38 is filled with vaporized fuel at a pressure close to the saturated vapor pressure.

According to the vaporized fuel production control described above, vaporized fuel can be stored in the vaporized fuel tank 38 while the engine is operating. Also, the vaporized fuel tank 38 is such that at least some of the vaporized fuel can be kept in a vapor state even when cold after the engine has stopped, by using the decrease in pressure that naturally occurs inside the tank. Incidentally, the vaporized fuel production control is preferably executed only when the temperature inside the vaporized fuel tank 38 is equal to or greater than a predetermined determining temperature at which vaporized fuel is able to be produced.

Vaporized fuel supply control is control that supplies vaporized fuel that has been stored in the vaporized fuel tank 38 to the surge tank 20 by opening both the vaporized fuel supply valve 42 and the air introduction valve 44 when the engine is started. More specifically, the ECU 70 first detects the output of a start command when the starter switch is turned on. Then the ECU 70 operates the starter motor 36 to start cranking while the vaporized fuel supply valve 42 and the air introduction valve 44 are closed, and the throttle valve 18 is kept in the fully-closed position. As a result, intake vacuum is generated in the surge tank 20 from the cranking.

Then once the intake vacuum in the surge tank 20 has increased sufficiently, the ECU 70 opens the vaporized fuel supply valve 42 and the air introduction valve 44. As a result, the vaporized fuel in the vaporized fuel tank 38 is supplied into the surge tank 20 by the intake vacuum. At this time, air of an amount corresponding to the amount of vaporized fuel that flows out flows into the vaporized fuel tank 38 through the air introduction valve 44, such that vaporized fuel is supplied smoothly.

Also, if the pressure in the vaporized fuel tank 38 is equal to or greater than atmospheric pressure when the vaporized fuel supply valve 42 and the air introduction valve 44 are opened, the vaporized fuel supply valve 42 is opened first. If, on the other hand, the pressure in the vaporized fuel tank 38 is less than atmospheric pressure, the air introduction valve 44 is opened first. As a result, it is possible to prevent vaporized fuel in the tank from flowing out into the atmosphere or air from flowing back into the vaporized fuel tank 38 from the surge tank 20.

Vaporized fuel that has been supplied from the vaporized fuel tank 38 to the surge tank 20 flows into the cylinder via the intake port 24 and is ignited and combusted in the cylinder. Then when it is confirmed that the engine has started by the engine speed rising or the like, the ECU 70 stops the cranking. Also, the ECU 70 closes the vaporized fuel supply valve 42 and the air introduction valve 44 and ends the vaporized fuel supply control. Then the ECU 70 starts normal fuel injection control and injects fuel from the intake port injection valve 26 and the in-cylinder injection valve 28. Incidentally, the switch from vaporized fuel supply control to normal fuel injection does not necessarily require that engine startup first be confirmed (i.e., that it first be confirmed that the engine has started). For example, the switch to normal fuel injection may be made when the amount of vaporized fuel required at startup has been supplied. Also, vaporized fuel may be supplied to the cylinders only during the first combustion cycle, and then normal fuel injection control may be executed from the second combustion cycle on.

If vaporized fuel that has been stored while the engine is operating is used in this way, compared to when vaporized fuel is produced at startup, vaporized fuel can be immediately supplied into the cylinders, thus enabling startability to be improved even when starting the engine at low temperatures (i.e., during a cold start) at which fuel does not easily vaporize. Incidentally, the vaporized fuel supply control is preferably executed only when the engine temperature (e.g., the temperature of the engine coolant, for example) at startup is equal to or less than a predetermined determining temperature that requires vaporized fuel.

The vaporized fuel supply control described above is effective because it stores a sufficient amount of vaporized fuel in the vaporized fuel tank 38 while the engine is operating. However, in cases such as when driving in which the engine is stopped after a short time after being started (i.e., so-called short trip operation) is repeated, for example, there may not be an opportunity to execute vaporized fuel production control, and as a result, a sufficient amount of vaporized fuel may not be stored in the vaporized fuel tank 38. If the engine is cold-started or the like in this state, a sufficient amount of vaporized fuel will not be supplied to the intake system, so startability will decrease.

Therefore, with the system according to this example embodiment, if a predetermined amount of vaporized fuel has not been produced in the vaporized fuel tank 38 and an engine stop command is output, vaporized fuel is effectively produced by generating a vacuum in the vaporized fuel tank 38 using the vacuum of the intake pipe while the engine is operating. More specifically, with the system according to this example embodiment, if the remaining amount of vaporized fuel Z in the vaporized fuel tank 38 after startup is substantially zero and there has been no opportunity to execute vaporized fuel production control while the engine is operating until an engine stop command is output thereafter, it is determined that there will not be enough vaporized fuel the next time the engine is started. In this case, the vaporized fuel supply valve 42 is temporarily opened while the air introduction valve 44 is kept in the closed position. Vacuum is generated in the surge tank 20 while the engine is operating. Therefore, when the vaporized fuel supply valve 42 is opened, the surge tank 20 will be communicated with the vaporized fuel tank 38, so the vacuum will also operate in the vaporized fuel tank 38. As a result, the pressure in the vaporized fuel tank 38 will abruptly drop, so a large vacuum is able to be effectively generated in the vaporized fuel tank 38 by closing the vaporized fuel supply valve 42 in this state.

Fuel tends to easily vaporize inside the vaporized fuel tank 38 that is sealed in this reduced-pressure state. Therefore, when fuel is injected into the vaporized fuel tank 38 by driving the in-tank injection valve 40, the injected fuel quickly becomes vaporized fuel in the reduced-pressure atmosphere.

In this way, according to the system in this example embodiment, the engine can be stopped with vaporized fuel stored in the vaporized fuel tank 38. Therefore, it is possible to effectively inhibit a situation from arising in which startability and emissions deteriorate due to there not being enough vaporized fuel the next time the engine is started.

Incidentally, the opening timing of the vaporized fuel supply valve 42 is preferably controlled based on the pressure (i.e., vacuum) in the vaporized fuel tank 38. That is, it is preferable that the pressure in the vaporized fuel tank 38 be detected using the tank pressure sensor 54, and the vaporized fuel supply valve 42 that is open be closed when this pressure reaches a predetermined vacuum. This enables the vacuum generated in the vaporized fuel tank 38 to be precisely controlled.

Figure 3:
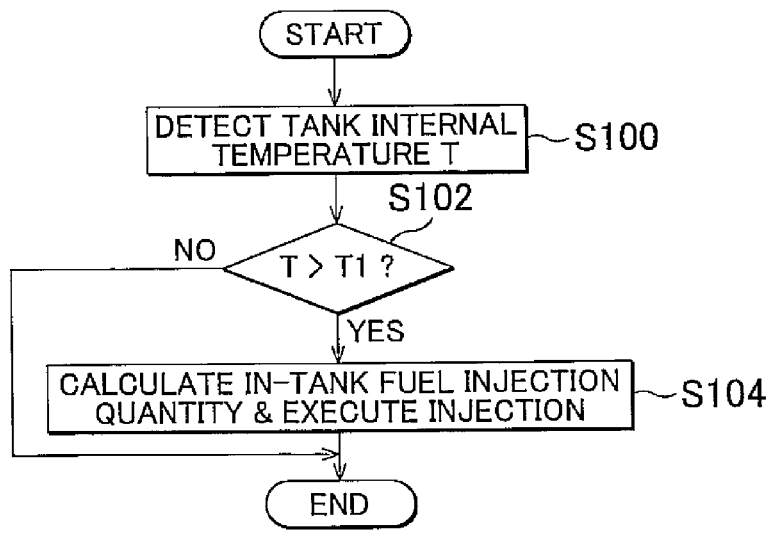
FIG. 3 is a flowchart illustrating a routine executed in the first example embodiment of the invention.

Next, a specific routine for realizing the control described above will be described with reference to FIGS. 3 to 5. First, FIG. 3 is a flowchart illustrating normal vaporized fuel production control executed by the ECU 70 in the first example embodiment of the invention. The routine in FIG. 3 is repeatedly executed while the engine is operating.

In the routine shown in FIG. 3, first, the temperature T in the vaporized fuel tank 38 is detected by the tank temperature sensor 56 (step S100), and it is determined whether this tank internal temperature T is higher than a determining temperature T1 (step S102). Here, the determining temperature T1 is a temperature that is set corresponding to the minimum value of the temperature at which vaporized fuel can be produced, and is a determining temperature for allowing fuel injection into the tank. If the determination in step S102 is yes, the temperature is such that fuel can easily vaporize, so the injection quantity of fuel to be injected into the vaporized fuel tank 38 is calculated and the in-tank injection valve 40 is driven while the vaporized fuel supply valve 42 and the air introduction valve 44 are closed (step S104). Accordingly, vaporized fuel is stored in the vaporized fuel tank 38.

Figure 4:
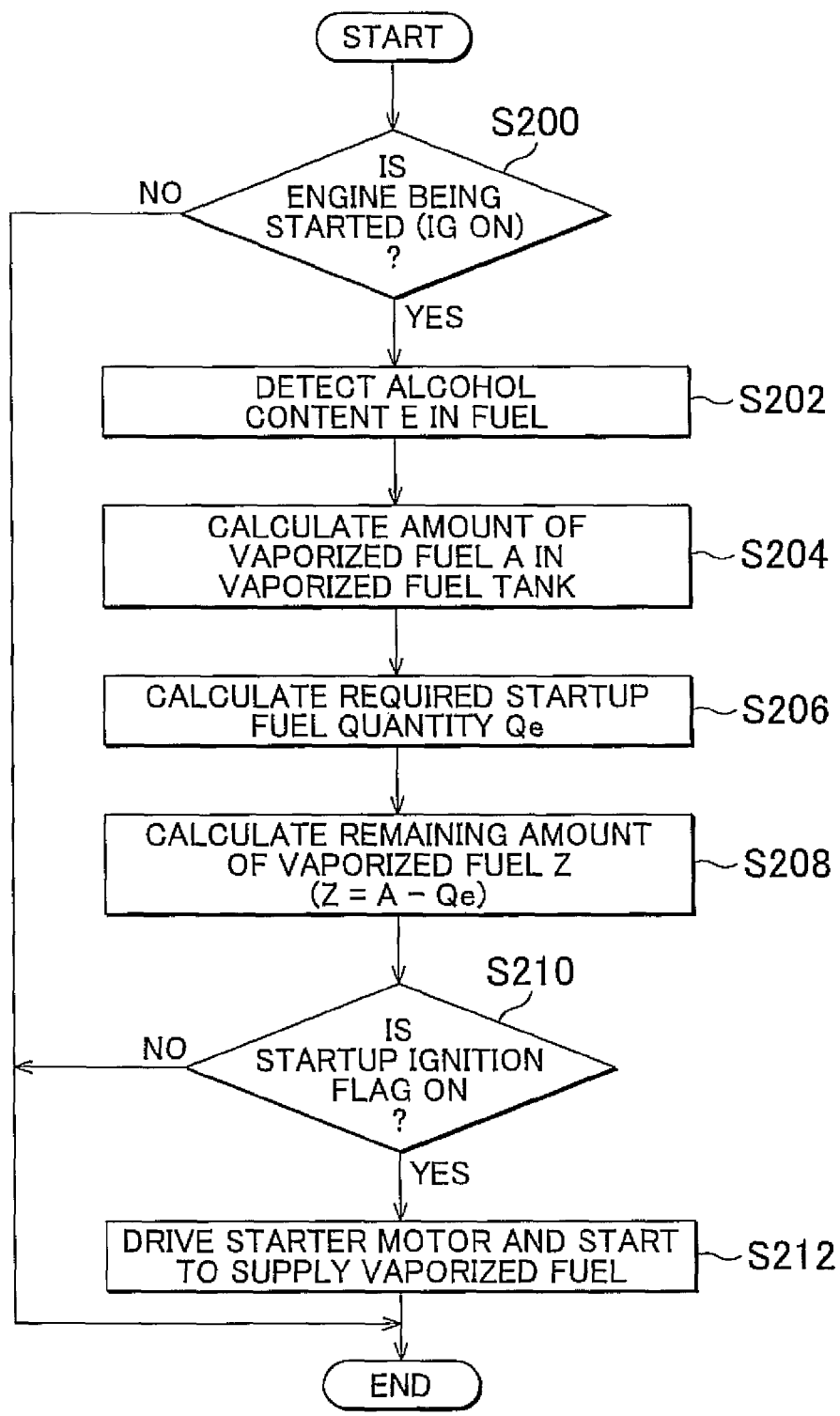
FIG. 4 is a flowchart illustrating another routine executed in the first example embodiment of the invention.

Next, FIG. 4 is a flowchart illustrating vaporized fuel supply control executed by the ECU 70 in the first example embodiment of the invention. The routine shown in FIG. 4 is repeatedly executed while the engine is operating.

In the routine shown in FIG. 4, first it is determined whether an ignition switch (IG) has been turned on (step S200). If the determination is no, this cycle of the routine immediately ends. If, on the other hand, the determination is yes, it is determined that the engine is being started, so the process proceeds on the next step in which an alcohol content E of the fuel in the fuel tank 32 is detected using the fuel property sensor 58 (step S202).

Next, an amount of vaporized fuel A in the vaporized fuel tank 38 is calculated (step S204). Here, more specifically, first the total fuel quantity Qt, the temperature Tt, and the pressure Pt in the vaporized fuel tank 38 are detected. The total fuel quantity Qt is obtained as the injection quantity of fuel injected into the vaporized fuel tank 38 in step S104 in the most recent vaporized fuel production control. Also, the temperature Tt and the pressure Pt in the vaporized fuel tank 38 are detected by the tank temperature sensor 56 and the tank pressure sensor 54, respectively. Next, the saturated vapor pressure P of the fuel in the vaporized fuel tank 38 is calculated by referencing saturated vapor pressure calculation map data based on the temperature Tt and the alcohol content E. Then the amount of vaporized fuel A in the vaporized fuel tank 38 is calculated based on these calculation values.

Next, a fuel quantity Qe required at startup (hereinafter also referred to as the "required startup fuel quantity Qe") is calculated based on the temperature environment at startup (step S206). Here, the temperature environment is the engine temperature or the like, for example. Required startup fuel quantity calculation map data for calculating the required startup fuel quantity Qe based on the engine temperature (e.g., the coolant temperature) is stored in advance in the ECU 70. At startup, more vaporized fuel is required at lower engine temperatures. Therefore, the required startup fuel quantity calculation map data is set such that the required startup fuel quantity Qe increases as the coolant temperature decreases. Here, more specifically, a required startup fuel quantity Qe that is appropriate for the temperature environment is calculated, referencing the required startup fuel quantity calculation map data, based on the output of the coolant temperature sensor 52.

Next, the remaining amount of vaporized fuel Z in the vaporized fuel tank 38 after startup is calculated (step S208). Here, more specifically, the remaining amount of vaporized fuel Z is calculated by subtracting the required startup fuel quantity calculated in step S206 from the amount of vaporized fuel A calculated in step S204.

Then it is determined whether the startup ignition flag is on (step S210). Here, more specifically, it is determined whether an engine start command has been output. If it is determined that an engine start command has not yet been output (i.e., NO in step S210), then this cycle of the routine immediately ends. If, on the other hand, the determination in step S210 is YES, then the process proceeds on to the next step in which the starter motor 36 is driven to start cranking and vaporized fuel is supplied (step S212). Here, more specifically, the vaporized fuel supply valve 42 and the air introduction valve 44 are opened and vaporized fuel corresponding to the required startup fuel quantity Qe is supplied from the vaporized fuel tank 38 into the surge tank 20 using the intake vacuum generated by the cranking.

Figure 5:
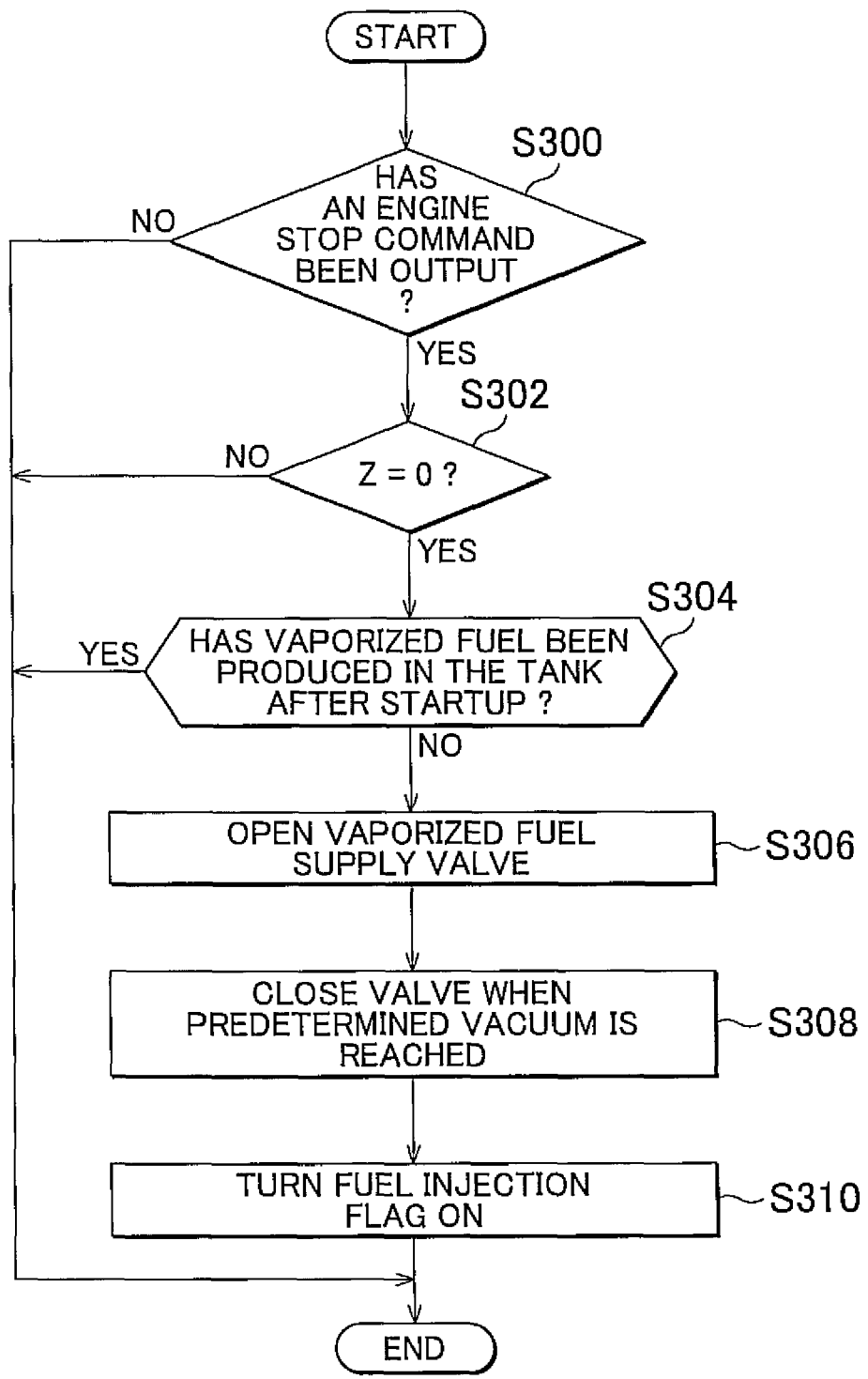
FIG. 5 is a flowchart illustrating yet another routine executed in the first example embodiment of the invention.

Next, FIG. 5 is a flowchart illustrating a vaporized fuel production routine at engine stop (i.e., when the engine is to be stopped) that is executed by the ECU 70 in the first example embodiment of the invention. The routine in FIG. 5 is repeatedly executed while the engine is operating.

In the routine in FIG. 5, it is first determined whether an engine stop command has been output (step S300). If an engine stop command has not yet been output (i.e., NO in step S300), then this cycle of the routine immediately ends. If, on the other hand, the determination in step S300 is yes, then the process proceeds on to the next step in which it is determined whether the remaining amount of vaporized fuel Z calculated in step S208 is 0 (zero) (step S302). If Z does not equal 0 (i.e., NO in step S302), it is determined that there is vaporized fuel remaining in the vaporized fuel tank 38, and this cycle of the routine immediately ends.

If, on the other hand, Z equals 0 (i.e., YES in step S302), it is determined that all of the vaporized fuel in the vaporized fuel tank 38 has been used during the current startup, so the process proceeds on to the next step in which it is determined whether vaporized fuel has been produced in the vaporized fuel tank 38 after startup (step S304). Here, more specifically, it is determined whether the vaporized fuel production control (see FIG. 2) described above has been executed after engine startup. If it is determined that the vaporized fuel production control has been executed (i.e., YES in step S304), then it is determined that there is vaporized fuel stored in the vaporized fuel tank 38, and this cycle of the routine immediately ends.

If, on the other hand, it is determined in step S304 that vapor fuel production control has not been executed (i.e., NO in step S304), then the process proceeds on to the next step in which the vaporized fuel supply valve 42 is opened while the air introduction valve 44 is closed and the throttle valve 18 is kept in the fully-closed position (step S306).

When the vaporized fuel supply valve 42 is opened, the pressure inside the vaporized fuel tank 38 decreases due to the vacuum of the intake system. Then the pressure in the vaporized fuel tank 38 (i.e., the tank internal pressure) is detected by the tank pressure sensor 54, and the vaporized fuel supply valve 42 is closed when the tank internal pressure has decreased to a predetermined vacuum (step S308). For this predetermined vacuum, a value set based on the alcohol content of the fuel and the coolant temperature is used as a vacuum at which vaporized fuel can effectively be produced. Then the fuel injection flag is turned on and fuel is injected into the vaporized fuel tank 38 (step S310).

As described above, with the system according to this first example embodiment, when an engine stop command has been output while vaporized fuel has not been produced in the vaporized fuel tank 38, a state that facilitates the production of vaporized fuel can be created by generating a vacuum in the vaporized fuel tank 38. Therefore, vaporized fuel to be used the next time the engine is started can be produced, thereby effectively inhibiting deterioration of startability and emissions due to an insufficient supply of vaporized fuel.

Incidentally, in the system according to this first example embodiment described above, the closing timing of the vaporized fuel supply valve 42 is controlled such that the vacuum in the vaporized fuel tank 38 comes to match a predetermined vacuum, but the method of controlling the vaporized fuel supply valve 42 open and closed is not limited to this. That is, as long as it is possible to determine the pressure state inside the vaporized fuel tank 38, the vaporized fuel supply valve 42 may also be closed when an integrated value of the air amount sucked out of the vaporized fuel tank 38 reaches a predetermined integrated air amount. As a result, a desired amount of air can be discharged from the vaporized fuel tank 38 so the predetermined vacuum can be effectively generated.

Also, in the system according to the first example embodiment described above, the vaporized fuel production control at engine stop described above is executed when the amount of vaporized fuel remaining in the vaporized fuel tank 38 is zero and vaporized fuel has not been produced after startup. However, the condition for executing the vaporized fuel production control at engine stop is not limited to this. That is, as long as it is possible to determine that there will not be enough vaporized fuel the next time the engine is started, the vaporized fuel production control may also be executed when there is a small amount of vaporized fuel remaining in the vaporized fuel tank 38.

Also, with the system according to the first example embodiment described above, the engine 10 that uses alcohol fuel is given as an example. However, the invention is not limited to this. For example, the invention may also be applied to an engine that uses normal gasoline or any of a variety of fuels in which a component other than alcohol has been added to gasoline.

Incidentally, in the first example embodiment described above, the in-tank injection valve 40 is one example of the in-tank fuel supplying device of the invention. Also, one example of the vaporized fuel producing apparatus of the invention is realized by the ECU 70 executing step S104, and one example of the vaporized fuel supplying device of the invention is realized by the ECU 70 executing step S212. One example of the determining apparatus of the invention is realized by the ECU 70 executing steps S302 and S304. One example of the vacuum generating apparatus of the invention is realized by the ECU 70 executing steps S306 and S308, and one example of the production controlling apparatus of the invention is realized by the ECU 70 executing step S310.

Also, in the first example embodiment described above, one example of the vaporized fuel remaining amount calculating apparatus of the invention is realized by the ECU 70 executing step S208.

Further, in the first example embodiment of the invention, one example of the pressure detecting device of the invention is realized by the ECU 70 executing step S308.

Next, a second example embodiment of the invention will be described with reference to FIG. 6. The system in this second example embodiment may be realized by having the ECU 70 execute the routine in FIG. 6 that will be described later, using the hardware structure shown in FIG. 1 and the control structure shown in FIG. 2.

Although the system in this second example embodiment employs the same structure as the first example embodiment, this system is characteristic in that the vaporized fuel supply valve 42 is opened after increasing the engine speed when an engine stop command has been output. Accordingly, a greater vacuum can be generated in the vaporized fuel tank 38, thus making it possible to effectively increase the amount of vaporized fuel able to be produced in the vaporized fuel tank 38.

Incidentally, with the system in this second example embodiment, the engine speed is preferably an engine speed at which the amount of vaporized fuel will come to be equal to or greater than a predetermined amount. Therefore, with the system in the second example embodiment, an estimated vacuum in the intake system when the vaporized fuel production control at engine stop is executed in the current operating state is first calculated. Then, an estimated value of the amount of vaporized fuel that can be produced when the pressure in the vaporized fuel tank 38 has been decreased to the estimated vacuum is calculated based on the alcohol content of the fuel and the engine temperature (e.g., the coolant temperature or the internal temperature of the vaporized fuel tank 38). Next, if the calculated estimated value of the vaporized fuel is less than a predetermined value, an engine speed at which the amount of vaporized fuel that is produced will become equal to or greater than the predetermined amount is calculated based on the alcohol content of the fuel and the engine temperature. A value that is set beforehand as the amount of vaporized fuel required the next time the engine is started may be used as this predetermined amount. Then vaporized fuel of this predetermined amount can be produced in the vaporized fuel tank 38 by controlling the engine speed to the calculated engine speed.

Next, the specific routine for executing the control described above will be described with reference to FIG. 6. FIG. 6 is a flowchart illustrating vaporized fuel production control at engine stop that is executed by the ECU 70 in a second example embodiment of the invention. The routine shown in FIG. 6 is repeatedly executed while the engine is operating.

Figure 6:
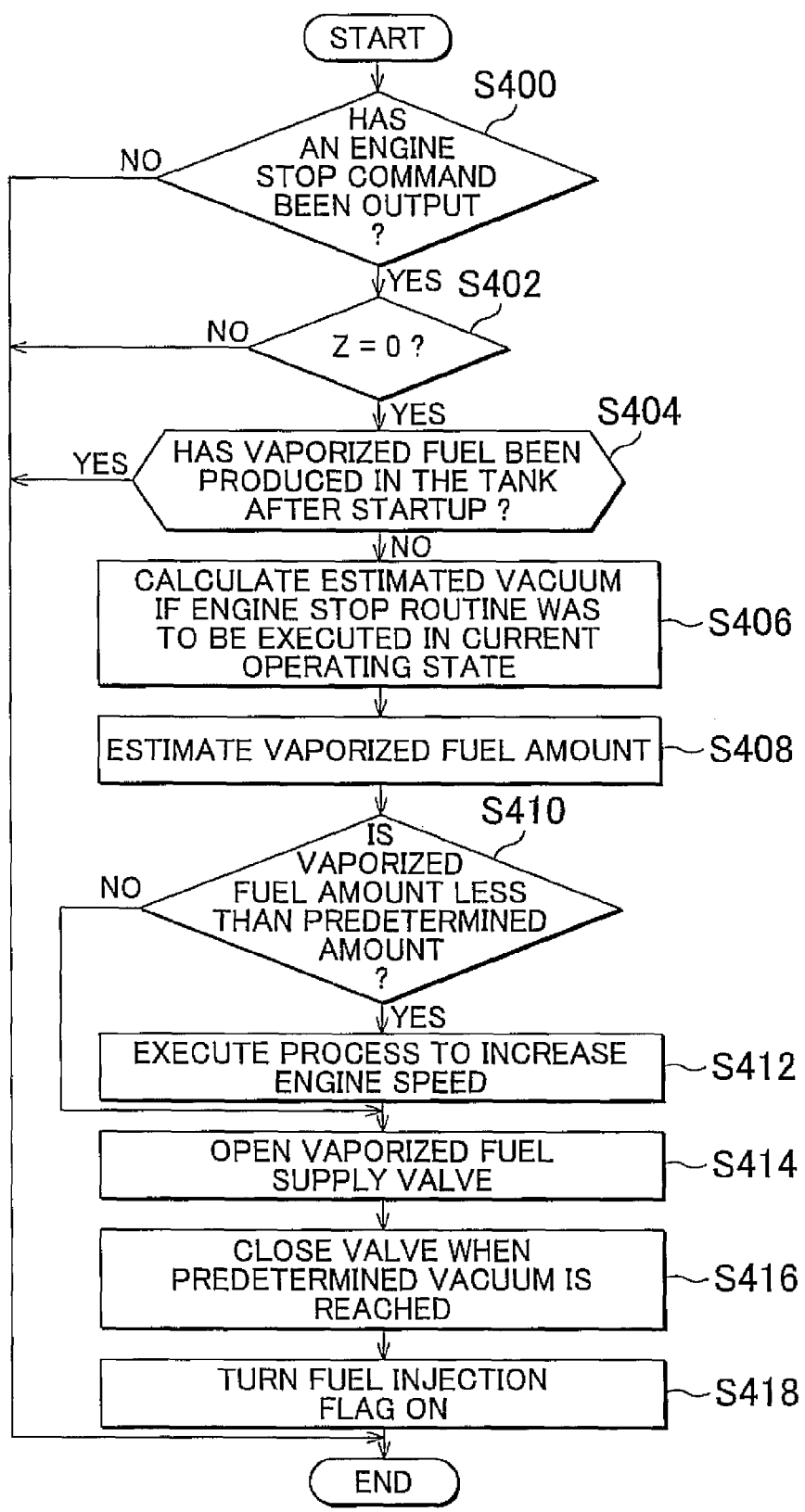
FIG. 6 is a flowchart illustrating a routine executed in a second example embodiment of the invention.

In the routine shown in FIG. 6, first it is determined whether an engine stop command has been output (step S400). If it is determined that an engine stop command has been output (i.e., YES in step S400), the process proceeds on to the next step in which it is determined whether the remaining amount of vaporized fuel Z calculated in step S208 is 0 (zero) (step S402). If Z=0 (i.e., YES in step S402), then the process proceeds on to the next step in which it is determined whether vaporized fuel has been produced in the vaporized fuel tank 38 after startup (step S404). These steps S400 to S404 are the same as steps S300 to S304 described above.

If it is determined in step S404 that vaporized fuel production control is not being executed (i.e., NO in step S404), then it is determined that vaporized fuel to be used the next time the engine is started is not stored in the vaporized fuel tank 38, so the process proceeds on to the next step in which the estimated vacuum of the intake system when the engine stop routine is executed in the current operating state is calculated (step S406). Next, the estimated value of the vaporized fuel amount that can be produced when the pressure in the vaporized fuel tank 38 is decreased to the estimated vacuum calculated in step S406 is calculated based on the alcohol content of the fuel and the engine temperature (step S408).

Next, it is determined whether the calculated estimated value of the vaporized fuel amount is less than a predetermined amount (step S410). If it is determined that the estimated value of the vaporized fuel amount is equal to or greater than the predetermined value (i.e., NO in step S410), then it is determined that the predetermined amount of vaporized fuel can be produced even if the vaporized fuel production control at engine stop has been executed at the current engine speed, so the process proceeds on to step S414, that will be described later, in which the vaporized fuel supply valve 42 is opened.

If, on the other hand, it is determined in step S410 that the estimated value of the vaporized fuel amount is less than the predetermined amount (i.e., YES in step S410), then it is determined that the predetermined amount of vaporized fuel cannot be produced even if the vaporized fuel production control at engine stop is executed at the current engine speed, so the process proceeds on to the next step in which a process to increase the engine speed is executed (step S412). Here, more specifically, first a target vacuum in the vaporized fuel tank 38 for making the amount of vaporized fuel that is produced become equal to or greater than the predetermined amount is calculated based on the alcohol content of the fuel and the engine temperature. Then a target value for the engine speed (i.e., a target engine speed) for making the vacuum of the intake system becomes equal to or greater than the target vacuum is calculated, and the engine speed is increased to this target engine speed.

Next, the vaporized fuel supply valve 42 is opened while the air introduction valve 44 is closed and the throttle valve 18 is in the fully-closed position (step S414). Then when the tank internal pressure decreases to the target vacuum, the vaporized fuel supply valve 42 is closed (step S416). Next, the fuel injection flag is turned on and fuel is injected into the vaporized fuel tank 38 (step S418).

As described above, with the system of this second example embodiment, the engine speed can be increased to the predetermined target engine speed when an engine stop command has been output when vaporized fuel is not being produced in the vaporized fuel tank 38. As a result, the target vacuum can be generated in the vaporized fuel tank 38, so the predetermined amount of vaporized fuel can be produced.

Incidentally, with the system of the second example embodiment described above, the target engine speed for producing the predetermined amount of vaporized fuel is calculated and the engine speed is increased to this target engine speed. However, the way in which the engine speed is increased is not limited to this. That is, as long as the engine speed is increased, it may also be increased to a predetermined speed that has been set in advance, for example. Therefore, at the very least, the vacuum generated in the vaporized fuel tank 38 can be increased, so the amount of vaporized fuel that is produced can be increased.

Further, with the system of the second example embodiment described above, the vaporized fuel production control at engine stop described above is executed when the amount of vaporized fuel remaining in the vaporized fuel tank 38 is substantially zero and vaporized fuel has not been produced after startup. However, the condition for executing the vaporized fuel production control at engine stop is not limited to this. That is, as long as it can be determined that there will not be enough vaporized fuel the next time the engine is started, the vaporized fuel production control may also be executed when there is a small amount of vaporized fuel remaining in the vaporized fuel tank 38.

Incidentally, in the second example embodiment described above, one example of the determining apparatus of the invention is realized by the ECU 70 executing steps S402 and S404, and one example of the vacuum generating apparatus of the invention is realized by the ECU 70 executing steps S414 and S416. One example of the production controlling apparatus of the invention is realized by the ECU 70 executing step S418.

Also, in the second example embodiment described above, one example of the pressure detecting device of the invention is realized by the ECU 70 executing step S416.

Also, in the second example embodiment described above, one example of the engine speed increasing apparatus of the invention is realized by the ECU 70 executing step S412.

Also, in the second example embodiment described above, one example of the target engine speed calculating apparatus of the invention is realized by the ECU 70 executing step S412.

Next, a third example embodiment of the invention will be described with reference to FIG. 7. The system according to this third example embodiment may be realized by having the ECU 70 execute the routine shown in FIG. 7 that will be described later, using the hardware structure shown in FIG. 1 and the control structure shown in FIG. 2.

With the system in the second example embodiment described above, the vaporized fuel supply valve 42 is opened after increasing the engine speed when an engine stop command has been output. Accordingly, a greater vacuum can be generated in the vaporized fuel tank 38, which enables the amount of vaporized fuel that can be produced in the vaporized fuel tank 38 to be effectively increased.

However, if the engine speed increases when the engine is in the process of being stopped, it will lead to a large deterioration of drivability and fuel efficiency. Therefore, with the system according to this third example embodiment, the vacuum in the vaporized fuel tank 38 is generated using the intake pipe vacuum of a fuel cut during deceleration (hereinafter referred to as a "deceleration fuel cut"), when the amount of vaporized fuel remaining in the vaporized fuel tank 38 is substantially zero. More specifically, a deceleration fuel cut can be executed even during predetermined cold operation, by reducing the execution condition related to the coolant temperature, of the conditions for executing a deceleration fuel cut. Therefore, it is possible to have the opportunity to decrease the pressure in the vaporized fuel tank 38 even when the engine is cold, in which case normal vaporized fuel production control is unable to be executed.

Incidentally, during a deceleration fuel cut, lockup is executed to inhibit a sudden drop in engine speed. Therefore, with the system according to this third example embodiment, it is preferable to advance the lockup timing, as well as reduce the conditions for executing the deceleration fuel cut. As a result, the intake pipe vacuum during a deceleration fuel cut can be further increased, which enables the pressure in the vaporized fuel tank 38 to be effectively decreased.

Next, the specific routine for executing the control described above will be described with reference to FIG. 7. FIG. 7 is a flowchart illustrating vaporized fuel production control that is executed by the ECU 70 in this third example embodiment of the invention. The routine shown in FIG. 7 is repeatedly executed while the engine is operating.

Figure 7:
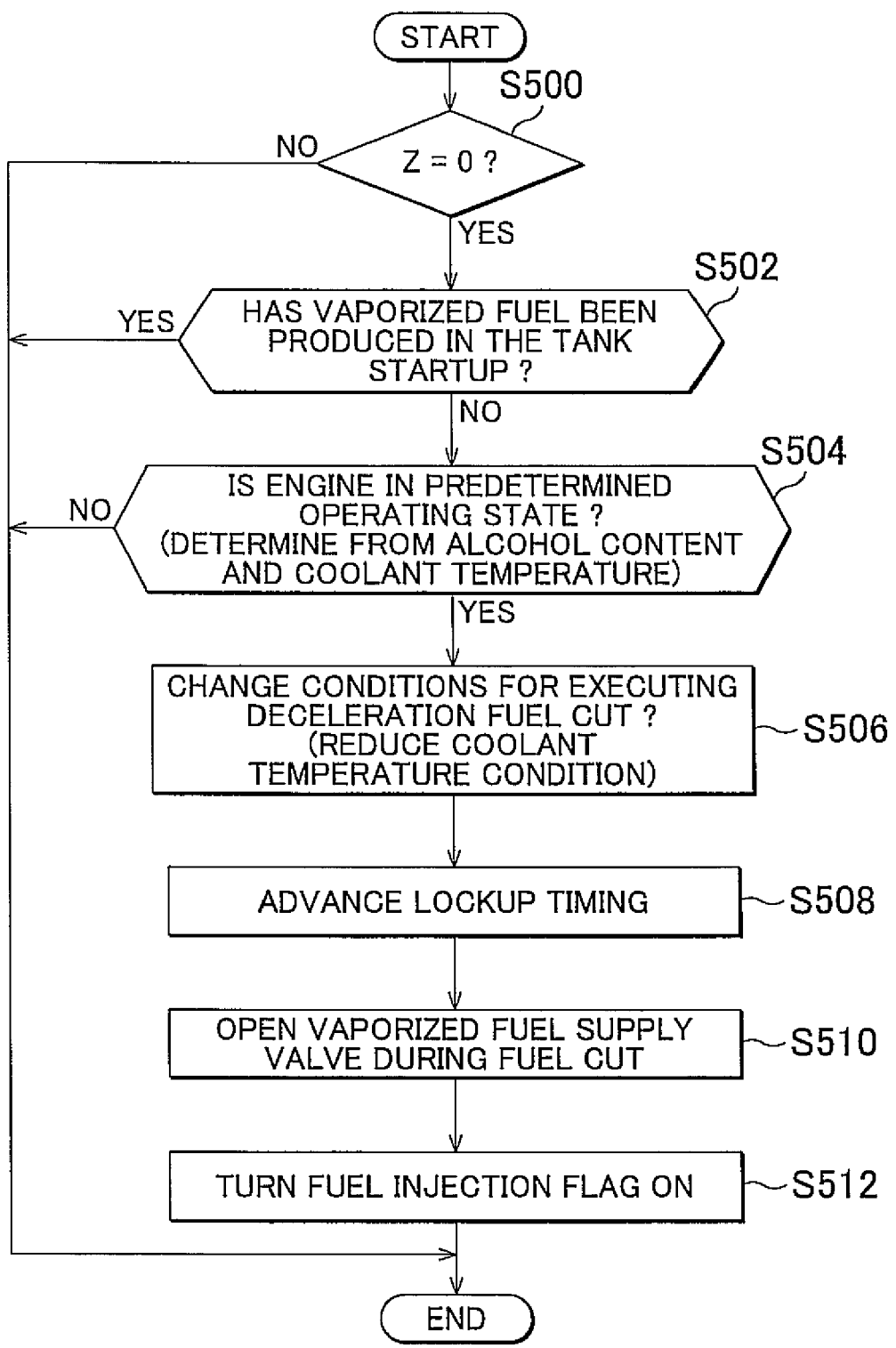
FIG. 7 is a flowchart illustrating a routine executed in a third example embodiment of the invention.

In the routine shown in FIG. 7, it is determined whether the remaining amount of vaporized fuel Z calculated in step S208 is 0 (zero) (step S500). If Z=0 (i.e., YES in step S500), then the process proceeds on to the next step in which it is determined whether vaporized fuel has been produced in the vaporized fuel tank 38 after startup (step S502). These steps S500 and S502 are the same as steps S302 and S304 described above.

If it is determined in step S502 that vapor fuel production control has not been executed (i.e., NO in step S502), then it is determined that vaporized fuel for use when starting the engine the next time is not stored in the vaporized fuel tank 38, so the process proceeds on to the next step in which it is determined whether the engine operating state is a predetermined cold operating state based on the alcohol content of the fuel and the coolant temperature (step S504). If for example the engine has warmed up enough so that normal vaporized fuel production control can be executed, or if the operating state is significantly poor when a deceleration fuel cut is executed immediately after a cold start, this cycle of the routine immediately ends.

If, on the other hand, it is determined that the engine operating state is the predetermined cold operating state, then it is determined that the conditions for executing the deceleration fuel cut can be reduced, and the process proceeds on to the next step in which the temperature condition, among the conditions for executing the deceleration fuel cut, is reduced (step S506). Also, in the next step, the lockup timing during a deceleration fuel cut is advanced (step S508).

Next, the vaporized fuel supply valve 42 is opened temporarily while the deceleration fuel cut is being executed (step S510). Here, more specifically, the vaporized fuel supply valve 42 is opened while the air introduction valve 44 remains closed, for the period of time during which the throttle valve 18 is kept in the fully-closed position, by executing the deceleration fuel cut (step S510). Then the fuel injection flag is turned on and fuel is injected into the vaporized fuel tank 38 (step S512).

As described above, with the system according to this third example embodiment, a greater vacuum can be generated in the vaporized fuel tank 38 by using the intake pipe vacuum during a deceleration fuel cut, while the engine is in a cold operating state in which no vaporized fuel is stored in the vaporized fuel tank 38.

Incidentally, in the third example embodiment described above, one example of the vaporized fuel remaining amount calculating apparatus of the invention is realized by the ECU 70 executing step S208, and one example of the execution condition changing apparatus of the invention is realized by the ECU 70 executing step S506. One example of the second vacuum generating apparatus of the invention is realized by the ECU 70 executing step S510, and one example of the second production controlling apparatus of the invention is realized by the ECU 70 executing step S512.

Also, in the third example embodiment described above, one example of the apparatus that advances the lockup timing of the invention is realized by the ECU 70 executing step S508.

Next, a fourth example embodiment of the invention will be described with reference to FIG. 8. The system according to this fourth example embodiment may be realized by having the ECU 70 execute the routine shown in FIG. 8 that will be described later, using the hardware structure shown in FIG. 1 and the control structure shown in FIG. 2.

Although the system in this fourth example embodiment employs the same structure as the first example embodiment, this system is characteristic in that the vaporized fuel supply valve 42 is opened and the vacuum in the vaporized fuel tank 38 is increased while the engine is operating. Accordingly, it is possible to create an environment in the vaporized fuel tank 38 that facilitates the production of vaporized fuel even during cold operation in which normal vaporized fuel production control is unable to be executed.

More specifically, with the system of this fourth example embodiment, when the remaining amount of vaporized fuel Z in the vaporized fuel tank 38 is a less than a predetermined value X, a tank internal pressure Ps (i.e., a target vacuum) at which an amount of vaporized fuel that is greater than the current remaining amount of vaporized fuel Z can be produced is calculated based on the alcohol content of the fuel and the coolant temperature. Also, an intake pipe vacuum Pg while the engine is currently operating is estimated based on the operating state such as the engine speed, the engine load, and the valve timing, and this estimated intake pipe vacuum Pg is then compared with the tank internal pressure Ps. If the intake pipe vacuum Pg is greater (i.e., a greater vacuum) than the tank internal pressure Ps, the pressure in the vaporized fuel tank 38 can be reduced to the tank internal pressure Ps that is the target vacuum. Therefore, the vaporized fuel supply valve 42 is opened and the pressure in the vaporized fuel tank 38 is decreased to the tank internal pressure Ps. Accordingly, it is possible to create an environment in the tank that facilitates the production of vaporized fuel even when the engine is cold in which case normal vaporized fuel production control is unable to be executed.

Next, a specific routine for realizing the control described above will be described with reference to FIG. 8. FIG. 8 is a flowchart illustrating vaporized fuel production control executed by the ECU 70, in the fourth example embodiment of the invention. The routine in FIG. 8 is repeatedly executed while the engine is operating.

Figure 8:
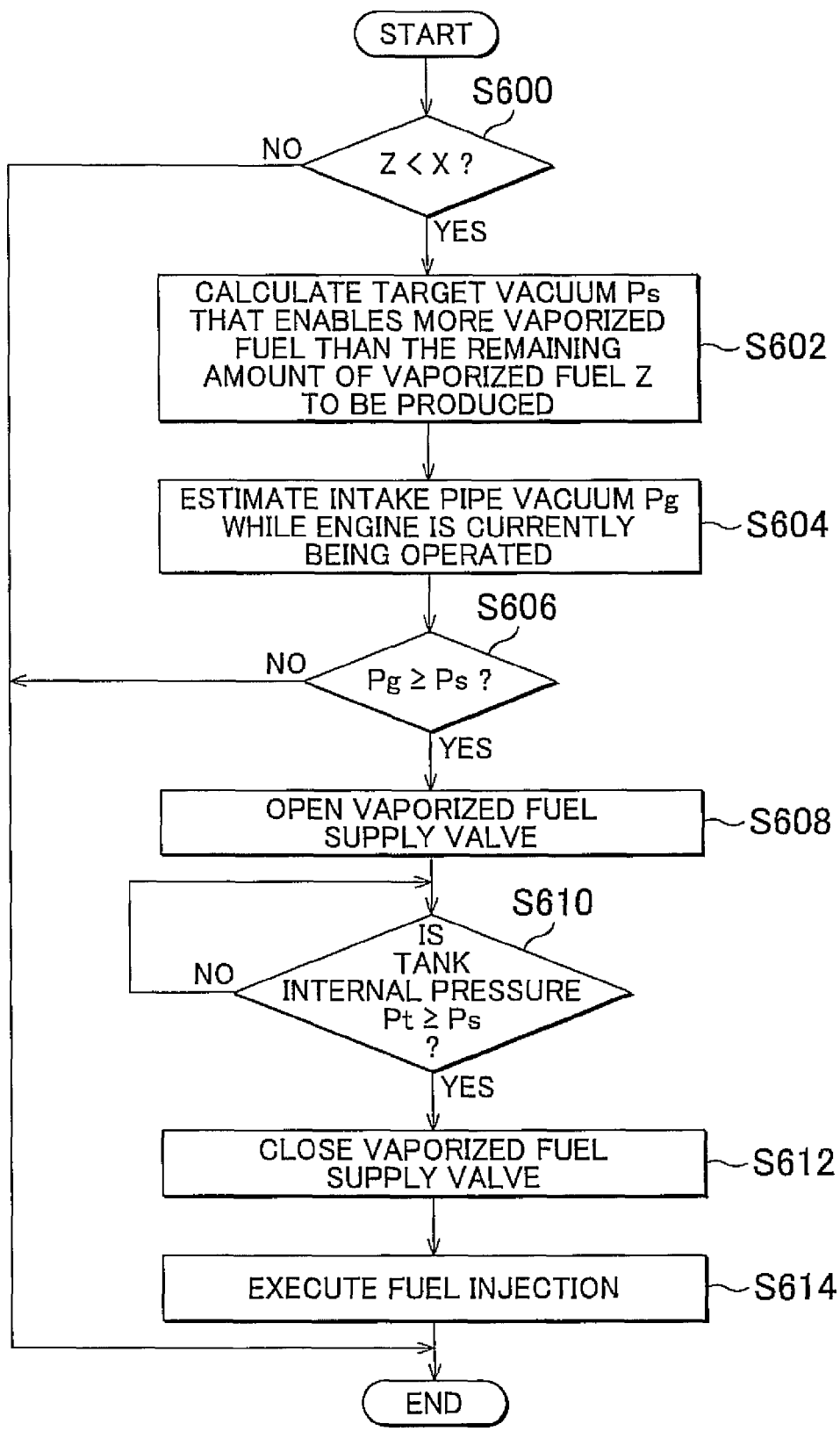
FIG. 8 is a flowchart illustrating a routine executed in a fourth example embodiment of the invention.

In the routine in FIG. 8, it is determined whether the remaining amount of vaporized fuel Z calculated in step S208 is less than the predetermined value X (step S600). Regarding the predetermined value X, a value that is stored in the ECU 70 beforehand is read as a threshold value for determining whether the vaporized fuel to be used the next time the engine is started. If Z is not less than X, it is determined that the required amount of vaporized fuel is remaining in the vaporized fuel tank 38, and this cycle of the routine immediately ends.

If, on the other hand, it is determined in step S600 that Z is less than X, it is determined that the vaporized fuel to be used the next time the engine is started is insufficient, and the process proceeds on to the next step in which the tank internal pressure (i.e., the target vacuum) Ps that enables more vaporized fuel than the current remaining amount of vaporized fuel Z to be produced, based on the remaining amount of vaporized fuel, the alcohol content of the fuel, and the coolant temperature of the vaporized fuel tank 38 (step S602).

Next, the intake pipe vacuum Pg while the engine is currently operating is estimated (step S604). Here, more specifically, the intake pipe vacuum Pg is estimated using a well-known estimation method based on the operating state such as the engine speed, the engine load, and the valve timing. Incidentally, the intake pipe vacuum Pg may also be detected by providing a pressure sensor in the surge tank 20.

Next, it is determined whether the intake pipe vacuum Pg (Pg>0) estimated in step S604 is equal to or greater than the target vacuum Ps (Ps>0) calculated in step S602 (i.e., whether Pg≧Ps) (step S606). If the intake pipe vacuum Pg is not equal to or greater than the target vacuum Ps (i.e., NO in step S606), then it is determined that the pressure in the vaporized fuel tank 38 cannot be decreased further even if the vaporized fuel supply valve 42 is opened, and this cycle of the routine immediately ends.

If, on the other hand it is determined in step S606 that the intake pipe vacuum Pg is equal to or greater than the target vacuum Ps (i.e., YES in step S606), then it is determined that the pressure in the vaporized fuel tank 38 can be decreased to the target vacuum Ps by opening the vaporized fuel supply valve 42, and the process proceeds on to the next step in which the vaporized fuel supply valve 42 is opened (step S608).

Next, it is determined whether the tank internal pressure Pt of the vaporized fuel tank 38 detected by the tank pressure sensor 54 has been decreased to equal to or greater than the target vacuum Ps (step S610). If the tank internal pressure Pt is not equal to or greater than the target vacuum Ps (i.e., NO in step S610), this step is executed again. If, on the other hand, it is determined in step S610 that the pressure in the vaporized fuel tank 38 has been decreased to the target vacuum Ps (i.e., YES in step S610), then it is determined that the pressure in the vaporized fuel tank 38 has been decreased to the target vacuum Ps, and the process proceeds on to the next step in which the vaporized fuel supply valve 42 is opened (step S612). Next, fuel is injected into the vaporized fuel tank 38 (step S614).

As described above, with the system according to this fourth example embodiment, the pressure in the vaporized fuel tank 38 can be decreased to the target vacuum Ps using an operating state in which the intake pipe vacuum Pg is larger than the target vacuum Ps, while the engine is operating when the remaining amount of vaporized fuel Z in the vaporized fuel tank 38 is insufficient. Accordingly, it is possible to create an environment in tank that facilitates the production of vaporized fuel even during cold operation in which the temperature in the vaporized fuel tank is low and normal vaporized fuel production control is unable to be executed.

Incidentally, in the fourth example embodiment, one example of the vaporized fuel remaining amount calculating apparatus of the invention is realized by the ECU 70 executing step S208, and one example of the target vacuum calculating apparatus of the invention is realized by the ECU 70 executing step S602. One example of the third vacuum generating apparatus of the invention is realized by the ECU 70 executing step S608, and one example of the third production controlling apparatus of the invention is realized by the ECU 70 executing step S614.

Also, in the fourth example embodiment, one example of the vacuum generating apparatus of the invention is realized by executing steps S610 and 612.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the scope of the invention.

What is claimed is:

1. A control apparatus for an internal combustion engine, comprising:
    a fuel tank in which fuel is stored;
    a vaporized fuel tank that is connected to a midway of an intake passage of the internal combustion engine and in which vaporized fuel that is the fuel that has been vaporized is stored;
    an in-tank fuel supplying device that supplies fuel in the fuel tank to the vaporized fuel tank;
    a normally-closed vaporized fuel supply valve that opens and closes a connecting portion between the vaporized fuel tank and the intake passage;
    a vaporized fuel producing apparatus that produces vaporized fuel in the vaporized fuel tank by driving the in-tank fuel supplying device while the vaporized fuel supply valve is closed, while the internal combustion engine is operating;
    a vaporized fuel supplying device that supplies vaporized fuel stored in the vaporized fuel tank to the intake passage by opening the vaporized fuel supply valve at startup of the internal combustion engine;
    a determining apparatus that determines whether an amount of vaporized fuel in the vaporized fuel tank becomes insufficient at next startup in a case where an engine stop command has been issued while the internal combustion engine is operating;
    a vacuum generating apparatus that generates a vacuum in the vaporized fuel tank by temporarily opening the vaporized fuel supply valve before the engine stops, in a case where it is determined by the determining apparatus that the vaporized fuel becomes insufficient; and
    a production controlling apparatus that executes the vaporized fuel producing apparatus after the vacuum generating apparatus has been executed.

2. The control apparatus for an internal combustion engine according to claim 1, further comprising:
    a vaporized fuel remaining amount calculating apparatus that calculates a remaining amount of vaporized fuel in the vaporized fuel tank after startup of the internal combustion engine,
    wherein the determining apparatus determines that the amount of vaporized fuel in the vaporized fuel tank becomes insufficient at next startup in a case where the remaining amount of vaporized fuel is substantially zero and the vaporized fuel producing apparatus has not been executed after startup.

3. The control apparatus for an internal combustion engine according to claim 1, wherein the vacuum generating apparatus includes a pressure detecting device that detects a pressure in the vaporized fuel tank after the vaporized fuel supply valve has been opened, and closes the vaporized fuel supply valve when the pressure in the vaporized fuel reaches a predetermined vacuum.

4. The control apparatus for an internal combustion engine according to claim 1, wherein the vacuum generating apparatus includes a rotational speed increasing apparatus that increases a rotational speed of the internal combustion engine before the vaporized fuel supply valve is opened.

5. The control apparatus for an internal combustion engine according to claim 4, wherein the rotational speed increasing apparatus includes a target rotational speed calculating apparatus that calculates a target rotational speed of the internal combustion engine for making the vaporized fuel produced in a case where the vaporized fuel producing apparatus is executed becomes a predetermined amount, and the rotational speed increasing apparatus increases the rotational speed to the target rotational speed in a case where the rotational speed is lower than the target rotational speed.

6. The control apparatus for an internal combustion engine according to claim 1, further comprising:
    a fuel cut apparatus that executes a fuel cut in a case where a predetermined execution condition is satisfied during deceleration of the internal combustion engine; and
    a vaporized fuel remaining amount calculating apparatus that calculates a remaining amount of vaporized fuel in the vaporized fuel tank after startup of the internal combustion engine;
    the predetermined execution condition being at least a condition that a water temperature of the internal combustion engine is equal to or greater than a predetermined water temperature,
    the control apparatus comprising:
    an execution condition changing apparatus that reduces a value of the predetermined water temperature in the execution condition in a case where the remaining amount of vaporized fuel is substantially zero and the vaporized fuel producing apparatus has not been executed after startup;
    a second vacuum generating apparatus that generates a vacuum in the vaporized fuel tank by temporarily opening the vaporized fuel supply valve while the fuel cut is being executed;
    a second production controlling apparatus that executes the vaporized fuel producing apparatus after the second vacuum generating apparatus has been executed.

7. The control apparatus for an internal combustion engine according to claim 6, further comprising:
    an apparatus that executes lockup while the fuel cut is being executed; and
    an apparatus that advances a timing of the lockup during a period of time during which the value of the predetermined water temperature is reduced by the execution condition changing apparatus.

8. The control apparatus for an internal combustion engine according to claim 1, further comprising:

a vaporized fuel remaining amount calculating apparatus that calculates a remaining amount of vaporized fuel in the vaporized fuel tank after startup of the internal combustion engine;

a target vacuum value calculating apparatus that calculates a target vacuum in the vaporized fuel tank that is necessary to store a larger amount of vaporized fuel than the remaining amount of vaporized fuel, in a case where the remaining amount of vaporized fuel is less than a predetermined value;

a third vacuum generating apparatus that generates a vacuum in the vaporized fuel tank by temporarily opening the vaporized fuel supply valve in a case where a vacuum value in the intake passage is larger than the target vacuum; and a third production controlling apparatus that executes the vaporized fuel producing apparatus after the third vacuum generating apparatus has been executed.

9. The control apparatus for an internal combustion engine according to claim 8, wherein the third vacuum generating apparatus closes the vaporized fuel supply valve when a vacuum valve in the vaporized fuel tank reaches the target vacuum value.

10. The control apparatus for an internal combustion engine according to claim 1, wherein the fuel is fuel that contains alcohol.

* * * * *